Figure 1:
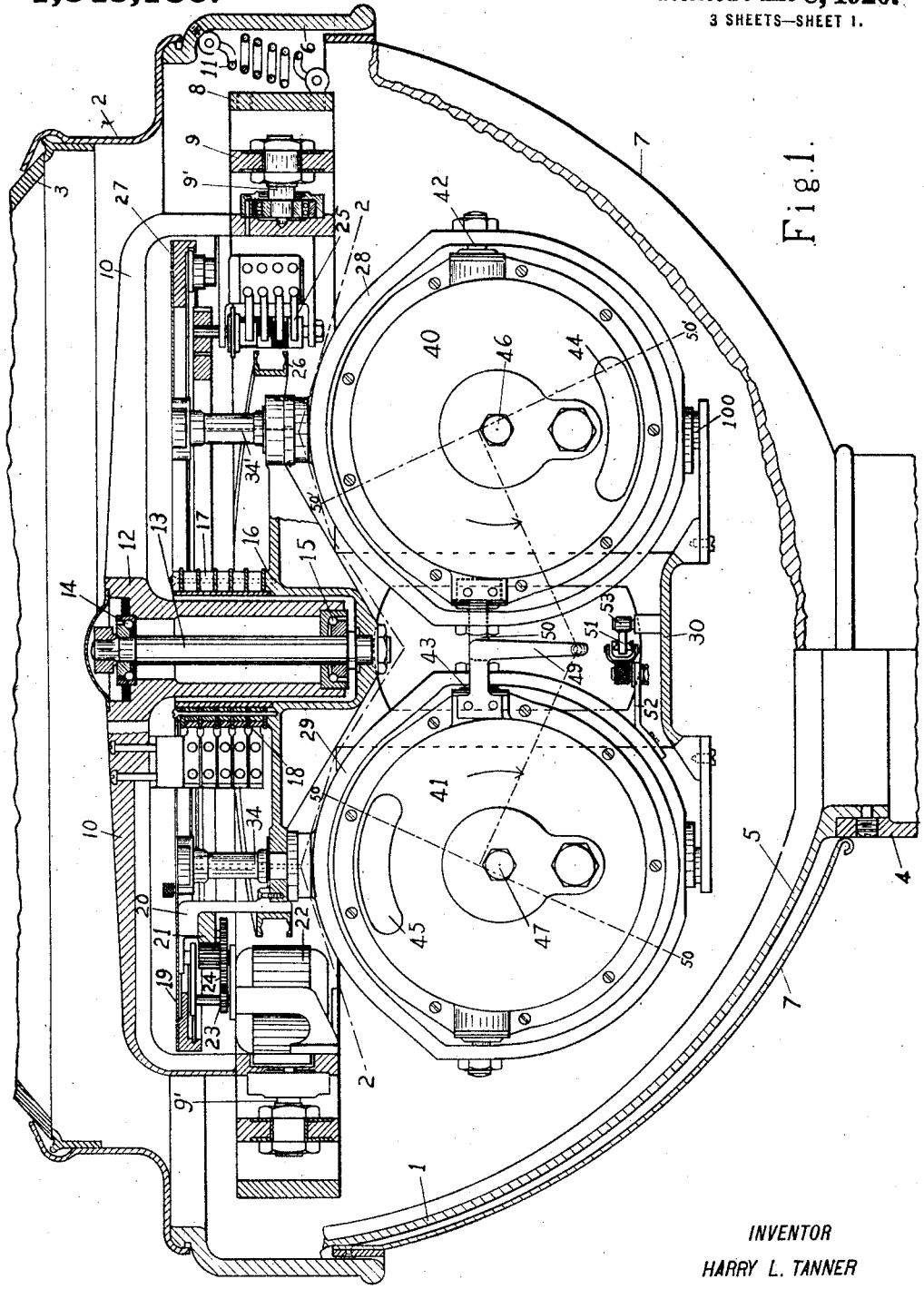

H. L. TANNER.
GYROSCOPIC NAVIGATIONAL APPARATUS.
APPLICATION FILED JULY 19, 1916.

1,343,188.

Patented June 8, 1920.
3 SHEETS—SHEET 2.

INVENTOR
HARRY L. TANNER.
BY
Herbert H. Thompson
ATTORNEY

H. L. TANNER.
GYROSCOPIC NAVIGATIONAL APPARATUS.
APPLICATION FILED JULY 19, 1916.

1,343,188.

Patented June 8, 1920.
3 SHEETS—SHEET 3.

INVENTOR
HARRY L. TANNER.
BY
Herbert H. Thompson
ATTORNEY.

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC NAVIGATIONAL APPARATUS.

1,343,188.   Specification of Letters Patent.   Patented June 8, 1920.

Application filed July 19, 1916. Serial No. 110,020.

*To all whom it may concern:*

Be it known that I, HARRY L. TANNER, a citizen of the United States, residing at 221 Eastern Parkway, Brooklyn, in the county of Kings and State of New York, have invented certain new and useful Improvements in Gyroscopic Navigational Apparatus, of which the following is a specification.

This invention relates to gyroscopic direction indicating instruments, and more especially to the type of such apparatus which has a positive directive power, that is an instrument which will seek the meridian, if displaced.

One object of this invention is to construct an entirely new type of gyroscopic compass in which the sources of error in all the present types of compasses are eliminated by the fundamental principles of design rather than by compensating attachments. Among the principal sources of deviation in the existing types of compasses may be mentioned friction about the vertical and horizontal axes of the gyroscope or gyroscopes and rolling of the ship, especially on an intercardinal course.

Another object of the invention is to simplify the construction of gyro-compass by eliminating the necessity for auxiliary stabilizing gyroscopes, which add little or nothing to the directive force of the compass.

According to my invention, I employ a plurality of rotors, preferably two, adapted to oppose each other in some respects and to aid each other in other respects. In this form of the invention the gyroscopes are designed to rotate in opposite directions. While I am aware that heretofore the advantages of utilizing oppositely rotating gyros in gyroscopic apparatus has been recognized and even that such gyros have been used in the gyro-navigational instruments of the non-directive type, I claim that I am the first to conceive how oppositely rotating gyros may be utilized to produce a positive, meridian seeking instrument.

The two gyroscopes are mounted on a common, orienting frame both for turning about independent vertical axes and for oscillation about horizontal axes. The gyroscopes are so interconnected and related to the main frame that the full gyroscopic effect of both gyroscopes is utilized as directive force to orient the main frame and to hold it on the meridian, while at the same time all errors due to rolling and pitching and to friction are eliminated. When two oppositely rotating pendulous gyroscopes are employed, it will be evident that one of them will tend to act as an ordinary gyrocompass. The behavior of the other gyroscope will be quite different, however. It will be seen that the effect of gravitation acting on the pendulous frame will be to cause the gyroscope to tend to precess farther away from the meridian, in case it was slightly disturbed. In other words, the gyroscope may be said to be in a condition comparable to unstable equilibrium, such as a magnetic compass needle which is placed with its north end pointing south.

I provide a means, however, for utilizing this unstable tendency and converting it into a positive directive force substantially equal in power to that of the other gyroscope. From a consideration of the problem presented, it will be evident that to give the oppositely rotating gyroscope directive power, a force must be brought into action as it tends to rise due to the earth's rotation, which is in the opposite direction to that normally exerted by gravity. One method of accomplishing this result is to employ a torque applying device acting about the horizontal axis of the gyroscope to overcome the natural effect of gravity. This may be brought into action by contacts operable upon relative tilting of the two gyroscopes. Another method is to reverse the action of gravity by making the gyroscope top-heavy instead of pendulous. Other methods will suggest themselves to those skilled in the art. My preferred method, however, is to reverse the normal action of gravity on the unstable gyroscope by so connecting it to the other gyroscope that the unstable gyroscope will become oppositely inclined to the inclination assumed by the other gyroscope. For this purpose and also to effect various other purposes intimately connected with this type of gyroscopic apparatus, I prefer to also employ a motor acting about the vertical axis of the main frame. This motor is preferably controlled by the turning of a gyroscope about its vertical axis within the frame. The connection between the two gyroscopes may be either rigid or yielding, and may connect either the vertical rings or the rotor bearing casings, and is such that the unstable gyroscope, intending to turn away from the meridian aids the other gyroscope in seeking the meridian, the reaction causing it to become oppositely inclined, as hereinafter explained.

Figure 2:
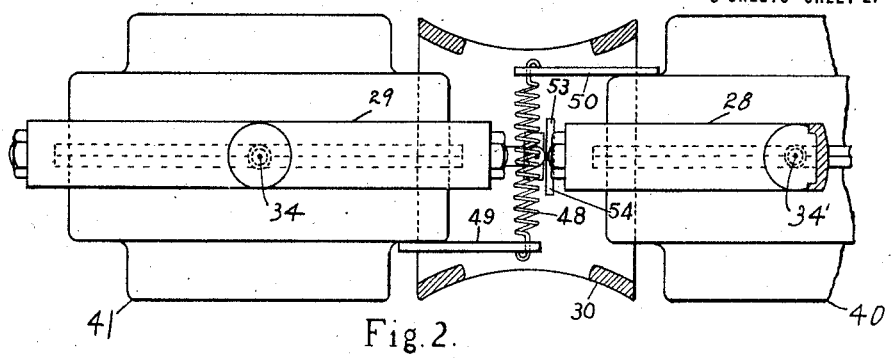
Figure 3:
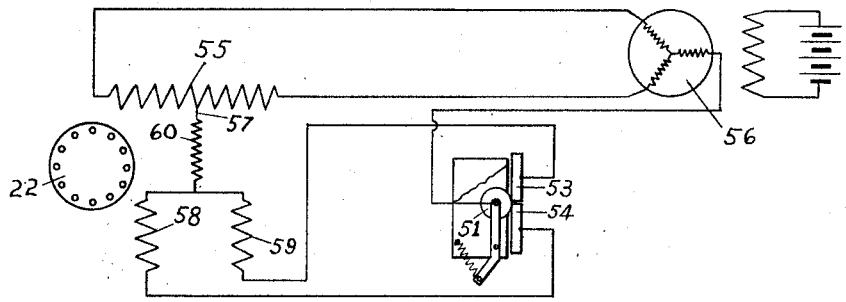
Figures 4, 5, 6:
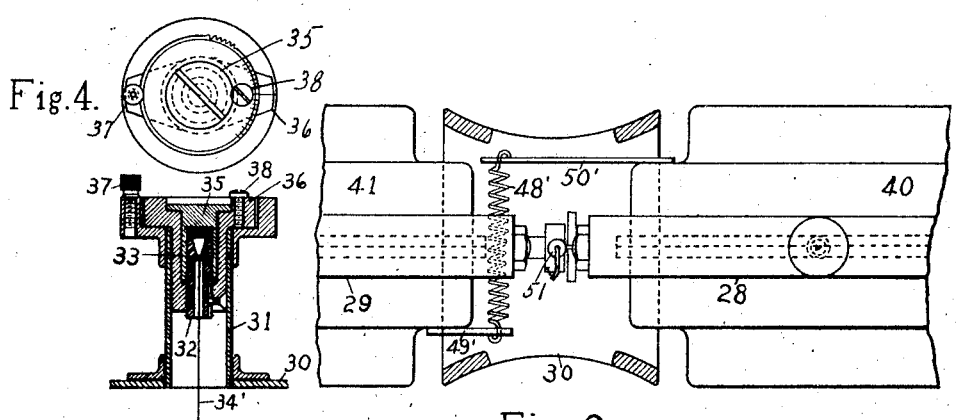
Figure 7:
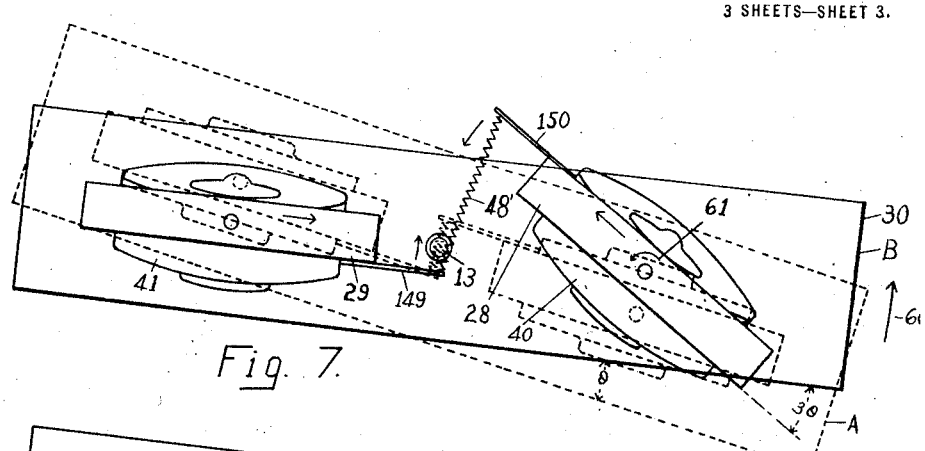
Figure 8:
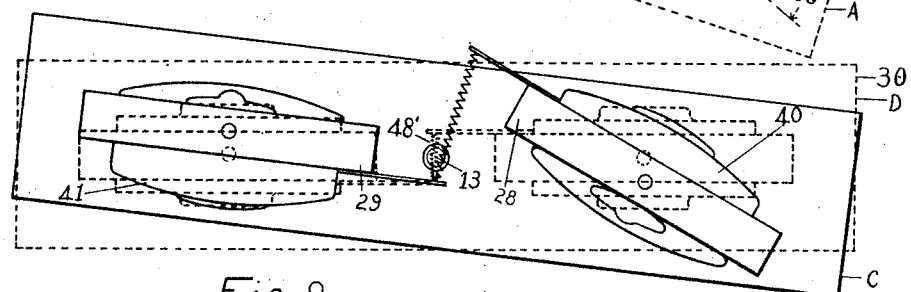

Referring to the drawings in which what I now consider to be the preferred forms of my invention are shown, Figure 1 is a south elevation, partly in section of a complete compass unit. Fig. 2 is a plan view, being taken on section line 2—2 of Fig. 1. Fig. 3 is a wiring diagram, showing the operation of the azimuth motor. Figs. 4 and 5 are plan and vertical section, respectively, of the supporting stem for one of the torsion wires. Fig. 6 is a diagrammatic view of another modification. Figs. 7 and 8 are diagrams illustrating the operation of the invention and also showing a slight modification.

The compass is shown as mounted in a bowl-shaped stand 1, which is provided with a removable cover 2, having a glass top 3. The stand is supported on a standard 4 from which ribs 5 extend to support the ring 6. The shell 7 of the bowl is made removable so that it can be lowered to inspect the compass. The outer gimbal ring 8 within which the inner ring 9 is pivotally supported on pivots (not shown) may be suspended from ring 6 by means of springs 11. The spider 10 is in turn pivoted to ring 9 by pivots 9' at right angles to said other pivots. The spider 10 is provided with a central elongated bearing member 12 which serves to support the azimuth movable unit 30 for rotation about a vertical axis. For this purpose the compass unit is provided with a vertical stem 13 journaled within bearing member 12 in antifriction suspension bearings 14 and 15. The rotatable unit 30 is provided with an extension 16 which may surround member 12 and is provided with collector rings 17 adapted to lead current into the rotatable unit from brushes 18 fixed to the spider 10. These rings not only bring in the three-phase current for driving the rotors, but also introduce current for the auxiliary control devices, hereinafter described.

The compass card is at 19 and is shown as supported from the rotatable unit by means of brackets 20, which may also serve to support the large gear 21. A motor 22 fixed to the spider 10 is adapted to drive said gear through double reduction gearing 23 and 24. Said gear may also serve to rotate a transmitter 25 by means of which the readings of the compass are transferred to repeater compasses located at various parts of the ship, as will be readily understood by those skilled in the art. The rotatable unit is also preferably provided with a cam ring 26 which coöperates with mechanism (not shown) to introduce corrections in the reading of the compass for variations in the ship's speed, heading and latitude, by shifting the position of the lubber ring 27.

The gyroscopic units, proper, are shown as mounted within vertical rings 28 and 29, which are pivotally supported about their vertical axes within the main frame 30. Preferably both rings are suspended by means of wires 34, 34' from the frame. For reasons which will subsequently appear, I prefer that the suspension wires 34 of the gyroscope 41 which is rotating in the direction usually employed in gyroscopic compass, be as flexible as possible; while suspension wire 34', for the oppositely rotating gyroscope 10, be more in the nature of a torsion wire, so that it will exert an appreciable centralizing effect upon the vertical ring. The preferred construction for this suspension is shown in Figs. 4 and 5. A hollow stem 31 is supported from the top of frame 30 and has mounted within it a plurality of interfitting rotatable parts. The innermost part comprises a threaded thimble 32 having a restricted passage 33 adapted to clamp the head of the torsion wires 34'. Said thimble is threaded in a rotatable sleeve 35, journaled within a second rotatable member 36. A set screw 37 is provided to lock member 36 to sleeve 31 when desired and a second set screw 38 supplied to lock sleeve 35 to member 36. This construction furnishes not only a long torsion wire for supporting the vertical ring, but also provides means for adjusting both the torsion or twist of the wire and its length. To adjust the length of the wire and thereby take more or less weight off the lower bearing 100 in the vertical ring, the screw 38 is released while screw 37 is clamped down, and sleeve 35 is turned by means of a screw driver. To adjust the torsion of the wire, screw 38 is tightened while screw 37 is released so that all the inner members are turned together. This last adjustment furnishes means for shifting the position at which the gyroscope is centralized for different latitudes. A compass of this character, it is found, will not settle exactly on the meridian when it is shifted from one latitude to another. The most convenient way of correcting this defect is to apply a slight torque about the individual vertical axes of the gyroscopes through one or both of the torsion wires as described, which will cause the gyroscopes to become oppositely inclined sufficiently to cause them to precess at the required rate to stay on the meridian. When the gyroscopes are thus inclined, the two vertical rings become slightly out of line, or in other words, assume a new centralized position.

The rotor casings 40 and 41 are pivoted on horizontal axes 42 and 43 within their respective vertical rings 28 and 29. In the embodiment shown, the rotor within casing 41 is adapted to be driven in the direction of the arrow, i. e., in the direction in which gyro compasses are ordinarily driven, while the rotor within casing 40 is adapted to be oppositely driven, so that this rotor is in an unstable condition. In Fig. 1 the spinning axes of the rotors are shown at 46—47 and are perpendicular to the plane of the paper. The rotors are constructed in the manner now preferred in gyroscopic compasses, being rotors of three-phase induction motors. Preferably, both gyroscopes are pendulous, as by placing the pivots 42, 43 above the center of gravity of the casings and their contained parts in each case; but unlike my previous invention above referred to, the centers of gravity are not symmetrically located. In other words, I prefer to make one of the casings, viz., casing 40, more pendulous than the other casing 41. This is illustrated in the drawing by showing a weight 44 near the bottom of casing 40 and a corresponding weight 45 on casing 41, above its center of gravity, but in practice these weights are dispensed with and the location of the horizontal bearings shifted. While according to my invention, any ratio of ballistic properties of the two casings may be adopted, I prefer to make casing 40 twice as pendulous as casing 41. Extending between the two gyroscopes is a resilient or yielding coupling means shown as spring 48. Preferably this spring extends axially of the gyroscopes between a pair of arms 49 and 50 secured to the gyroscopes. In the preferred construction shown in Figs. 1 and 2, these arms are attached to the rotor casings 40 and 41 and extend below the pivotal axes 42—43, so that the spring 48 if placed under tension will exert a torque, not only about the vertical axes of the gyroscopes within the frame 30, but also about their horizontal axes. In other words, spring 48 is so located as to exert a torque about an axis 50—50 inclined to the vertical, which may be resolved into a torque about both the vertical and horizontal axes. By so locating the spring not only does it serve as a connection for rendering the entire unit operative to seek the meridian but it serves to quickly damp out oscillations both of the entire unit about the meridian and of the individual gyroscopes as pendulums. The first action is caused by the fact that the spring opposes the inclination of each gyroscope due to the operation hereinafter set forth by causing precession in the proper direction and thus robs the oscillations of their energy by tending to decrease the opposite elevation of each gyroscope. The second mentioned action is due to the horizontal component of the spring's action, which, it will be seen, is in such a direction as to oppose and quickly suppress oscillations of the gyroscope as pendulums within the supporting frame. The period of these oscillations is very much less than the period of oscillation of the frame about the meridian. In operation, it should be observed the spring is brought into action for both purposes by the turning of gyroscope 40 within the support about its vertical axis. As explained hereinafter, the spring may also be connected between the vertical ring 28 and 29, but in this position an auxiliary damping means should be employed for suppressing the oscillations of the gyroscopes as pendulums. The oscillations about the meridian, however, will be still damped both by the action of the torsion wire 34', which opposes all precession within the frame and by the action of spring 48. The action of the torsion wire remains substantially the same as in my said other applications and in this case supplements the action of spring 48. Its damping effect is communicated to gyroscope 41 through spring 48.

Operable between gyroscope 41 and a point on frame 30, or on some other part of the apparatus disconnected from gyroscope 41, are electric contacts adapted to control motor 22 above described. The contacts are shown as consisting of a trolley or brush 51, pivotally mounted upon an arm 52 extending from ring 29 and a pair of reversing contacts 53—54 secured to frame 30. As the trolley rolls from one contact to the other, motor 22 is reversed, thereby causing the main frame 30 to maintain a fixed position relative to ring 29 (see Fig. 3).

According to this invention, this feature plays several important functions intimately connected with this type of compass. One of the most important of these is to cause spring 48 to be placed under tension by opposite rotation of the vertical rings 28—29, (see Fig. 7). In other words the opposite precession of the two gyros caused by the action of gravity will cause the spring to be placed under tension and thereby apply forces on the gyroscopes. In the embodiment shown this tension is further increased by the faster rotation of ring 28 due to the greater ballistic of casing 40. Another function of motor 22 is to prevent spring 48 from being placed under tension by equal and like rotation of rings 28 and 29. It should also be observed that due to the location of spring 48 below the horizontal pivots the spring is also placed under tension by the oscillations of casings 40 and 41 on their horizontal axis in opposite directions, but not by equal and like oscillation. It is also possible for the gyroscopes to assume opposite inclined positions with the vertical rings out of line such that spring 48 remains unstrained.

I prefer to employ the same three-phase current for driving motor 22 as is used to drive the rotors of the gyroscopes. In order to enable me to reverse motor 22 by employing only two contacts and at the same time retain the advantage of a polyphase induction motor, I have devised a special form of winding for the motor, illustrated in Fig. 3. By this winding I convert motor 22, in effect, into a two-phase induction motor which is operable on a three phase circuit. One of the coils 55 of said motor which may be termed the main winding is connected to two phases of the generator 56 and a tap 57 is taken off at a point between the ends of said coil, preferably near its center. Connected to said tap are the two coils 58—59 termed teaser windings, which are alternately connected to the third phase of the generator, through contacts 53—54. Preferably I interpose a resistance 60 between coils 58—59 and coil 55 to limit the current through these coils when both are in circuit, i. e., when trolley 51 is in the neutral position. When this occurs, the counter E. M. F. due to inductance disappears, so that, without a resistance, a distructive rush of current might take place. The teaser windings are of course, oppositely wound upon the motor so as to reverse the direction of the revolving torque.

The operation of my invention is shown in Figs. 7 and 8. As above stated, I prefer to make the torsion suspension for gyroscope 41 fairly stiff so as to exert an appreciable centralizing effect upon the gyroscope. I also find it desirable in order to completely eliminate errors due to rolling and pitching of the ship to establish a definite relation between the torsion of this centralizing means and the tension of the spring 48. This relation bears a predetermined relation to the pendulous or ballistic properties of the two gyroscopes. More specifically, I prefer to so relate these two yielding or resilient means that the ratio of the ballistic properties of gyroscope 41 to those of gyroscope 40 equals the ratio of the strength of spring 48 to the strength of spring 48 plus the strength of suspension wires 34'. Where gyroscope 40 is made twice as pendulous as gyroscope 41 this works out very simply into making the two springs so that they will apply equal torques about the vertical axis of ring 28. In these figures the tension spring 48' is shown as attached to brackets 149 and 150 extending from the vertical rings 28—29, instead of to brackets attached to the rotor cases, since this construction will produce similar operation to the other, except that the damping effect is absent, as explained above.

Assuming that the main frame 30 is turned off of the meridian (see Fig. 7, position A) as the earth turns out from under them the tops of casings 40—41 will turn outwardly. As soon as this occurs, gravity, acting on the pendulous casings, will cause precession of gyroscope 41 in the direction indicated by arrow 60, and precession of gyroscope 40 at twice the speed and in an opposite direction, since two gyroscopes are rotating in opposite directions; at the same time, the main frame 30 will be turned with gyroscope 41 by means of the motor 22. We will then have the main frame 30 and gyroscope 41 turned through angle $\theta$ from its original position, while gyroscope 40 has been turned about its vertical axis within the frame, through angle $2\theta$, and at the same time has not turned with frame 30, so that it is now inclined at an angle $3\theta$ to frame 30. The result is as shown in position B, spring 48' being placed under tension and exerting a torque on each gyroscope in the direction of the arrows. It will be seen that this torque tends to pull gyroscope 41 around toward the meridian and at the same time pull gyroscope 40 also toward the meridian, since opposite forces acting upon opposite lever arms exert like turning moments. At the same time it should be remembered that the torsion suspension 34' gyroscope 40 is exerting a torque in the direction of arrow 61,—in other words, in the same direction as spring 48'; so that we have acting upon gyroscope 40 the combined effect of both of these resilient means, while acting upon gyroscope 41 we have only the spring 48'. The result of these torques would be, of course, a further inclination of gyroscope 41 at a certain rate and a rapid decrease in the inclination of gyroscope 40 at twice the rate of movement of gyroscope 41, since in the embodiment shown the forces exerted by the two resilient means are assumed to be equal. The result will be that gyroscope 41 will become inclined at a comparatively large angle to the horizontal, while gyroscope 40 will become inclined at an opposite angle to the horizontal, which is equal to only about one-half of the angle at which the gyroscope 41 is inclined; or more accurately speaking, so that the force exerted by gravity on each will be equal (position C, Fig. 8).

The resulting precession will bring frame 30 to position D or in other words, to the meridian. It is to be understood, of course, that this is merely the bare outline of the operation and that the effect of the oscillations about the meridian and as a pendulum are compounded with the above steps. Both of said operations, however, are quickly damped, the compass being practically dead beat.

Fig. 6 illustrates one or two of the many modifications of which my invention is capable. According to this modification, the spring 48' is secured to lever arms 49', 50' of different lengths so that the torque exerted by the spring on the two casings will be different. This renders it unnecessary to employ a torsion suspension 34' for gyroscope 40, to increase the torque thereon.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:—

1. A gyroscopic compass having a plurality of meridian seeking gyroscopes with different ballistic properties.

2. A gyroscopic compass having a plurality of meridian seeking gyroscopes with different ballistic properties, and with like moments of inertia.

3. A gyroscopic compass having a plurality of oppositely rotating meridian seeking gyroscopes with different ballistic properties.

4. In gyroscopic apparatus, a main support mounted for rotation about a vertical axis, a plurality of gyroscopes mounted for rotation about individual vertical axes within the frame, and yielding means interconnecting said gyroscopes adapted to exert torques about said vertical axes.

5. In a gyroscopic apparatus, a main support mounted for rotation about a vertical axis, a plurality of gyroscopes having different rates of precession mounted for rotation about individual vertical axes within the frame, and yielding means interconnecting said gyroscopes adapted to exert torques about said vertical axes in the same angular direction.

6. A gyroscopic compass having a plurality of meridian seeking gyroscopes having different rates of precession.

7. In gyroscopic apparatus, a main support mounted for rotation about a vertical axis, a plurality of gyroscopes mounted for rotation about individual vertical axes within the frame, and yielding means interconnecting said gyroscopes, said means being so designed that the precessional movements produced by gravity will bring into action said means.

8. In gyroscopic apparatus, a main support mounted for rotation about a vertical axis, a plurality of oppositely rotating gyroscopes mounted for rotation about individual vertical axes within the frame, and yielding means interconnecting said gyroscopes, said means being so designed that the precessional movements produced by gravity will bring into action said means.

9. In gyroscopic apparatus, a rotatable support, a pair of gyroscopes mounted thereon for precession within the support, means for maintaining the support in a predetermined relation to one of said gyroscopes, and yielding means connecting the two gyroscopes.

10. In a gyroscopic apparatus, a rotatable support, a pair of gyroscopes mounted thereon for precession within the support, means for maintaining the support in a predetermined relation to one of said gyroscopes, a yielding centralizing means connecting a gyroscope and the support and other yielding means connecting the two gyroscopes, the two means having a predetermined relative strength.

11. In gyroscopic apparatus, a rotatable support, a pair of gyroscopes mounted thereon comprising a pair of vertical rings rotatably mounted thereon, a rotor and rotor bearing frame pendulously mounted in each ring, one frame being more pendulous than the other, means for maintaining said support in a predetermined relation to one of said gyroscopes, and yielding means connecting the two gyroscopes.

12. In gyroscopic apparatus, a rotatable support, a pair of gyroscopes mounted thereon comprising a pair of vertical rings rotatably mounted thereon, a rotor and rotor bearing frame pendulously mounted in each ring, one frame being more pendulous than the other, means for maintaining said support in a predetermined relation to one of said gyroscopes, a yielding centralizing means connecting a gyroscope and the support and other yielding means connecting the two gyroscopes, the ratio of the ballistic properties of one gyroscope being to that of the other substantially as the strength of the first means is to the strength of the first and second means combined.

13. In gyroscopic apparatus, a pair of gyroscopes mounted on a common support for precession about parallel axes and oscillation about axes at right angles thereto, and resilient means connecting said gyroscopes adapted to exert a torque on each gyroscope about axes inclined to said other axes.

14. In gyroscopic apparatus, a pair of gyroscopes mounted on a common support for precession about parallel axes and oscillation about axes at right angles thereto, and resilient means connecting said gyroscopes adapted to exert a torque on each gyroscope about axes inclined to said other axes and to each other.

15. In gyroscopic apparatus, a pair of gyroscopes mounted on a common support for precession about parallel axes and oscillation about axes at right angles thereto, and resilient means connecting said gyroscopes adapted to be brought into action by displacement of the gyroscopes in the same angular direction.

16. In gyroscopic apparatus, a pair of gyroscopes mounted on a common support for precession about parallel axes and oscillation about axes at right angles thereto, and resilient means connecting said gyroscopes adapted to be brought into action by opposite oscillation about said second mentioned axes.

17. In gyroscopic apparatus, a main support mounted for rotation about a vertical axis, a plurality of gyroscopes mounted for rotation about individual vertical axes within the frame, means for maintaining the frame in a predetermined relation with respect to one of said gyroscopes, and means brought into action by departure of the other gyroscope from its predetermined relation with respect to said frame for applying a torque about an axis of said first mentioned gyroscope.

18. In gyroscopic apparatus, a main support mounted for rotation about a vertical axis, a plurality of gyroscopes mounted for rotation about individual vertical axes within the frame, means for maintaining the frame in a predetermined relation with respect to one of said gyroscopes, and means brought into action by departure of the other gyroscope from its predetermined relation with respect to said frame for applying a torque about the vertical axis of said second mentioned gyroscope.

19. In gyroscopic apparatus, a main support mounted for rotation about a vertical axis, a plurality of gyroscopes mounted for rotation about individual vertical axes within the frame, means for maintaining the frame in a predetermined relation with respect to one of said gyroscopes, and means brought into action by departure of the other gyroscope from its predetermined relation with respect to said frame for applying a torque about the vertical axis of each of said gyroscopes.

20. In gyroscopic apparatus, a rotatable support, a pair of gyroscopes mounted thereon comprising a pair of vertical rings rotatably mounted thereon, a rotor and rotor bearing frame mounted in each ring on horizontal pivots, and a spring secured to each frame to one side of its pivots, and extending at a substantial angle to the normal plane of the rotors.

21. In gyroscopic apparatus, a rotatable support, a pair of gyroscopes mounted thereon comprising a pair of vertical rings rotatably mounted thereon, a rotor and rotor bearing frame pendulously mounted in each ring, one frame being more pendulous than the other, a yielding centralizing means connecting a gyroscope and the support and other yielding means connecting the two gyroscopes, the ratio of the ballistic properties of one gyroscope being to that of the other substantially as the strength of the first means is to the strength of the first and second means combined.

22. In a gyroscopic compass, the combination with a rotor and rotor bearing frame, means for pivotally mounting the same about horizontal and vertical axes at an angle to the spinning axis, and means responsive to turning of the gyroscope about its vertical axis for applying a torque about its horizontal axis.

23. In a gyroscopic compass, the combination with a rotor and rotor bearing frame, means for pivotally mounting the same about horizontal and vertical axes at an angle to the spinning axis, and means responsive to turning of the gyroscope about its vertical axis for applying a torque about its horizontal axis in a direction such as to oppose the elevation produced by the rotation of the earth.

24. In a gyroscopic compass, the combination with a support rotatably mounted about a vertical axis, a rotor and rotor bearing frame, means for pivotally mounting the same about horizontal and vertical axes within the support, and means responsive to turning of the gyroscope about its vertical axis within the frame for applying a torque about its horizontal axis.

25. In a gyro-compass, a main rotatable support, a gyroscope mounted thereon, a pair of contacts and a brush operable thereby, and a reversible induction motor for rotating the support including a main winding and a pair of teaser windings connected to an intermediate point of said main winding, each one of said teaser windings being connected to one of said contacts.

26. A gyroscopic compass including a normally stable and a normally unstable gyroscope and means controlled by the gyroscopes for causing the unstable gyroscope to become oppositely inclined to the other for imparting directive power thereto.

27. A gyroscopic compass including a normally stable and a normally unstable gyroscope and a coupling between the gyroscopes causing the unstable gyroscope to become oppositely inclined to the other for imparting directive power thereto.

28. A gyroscopic compass including a normally stable and a normally unstable gyroscope and resilient means interconnecting the gyroscopes causing the unstable gyroscope to become oppositely inclined to the other for imparting directive power thereto.

29. A gyroscopic compass comprising a support movable about a vertical axis, a plurality of gyroscopes having normally horizontal spinning axes, a support in which each gyroscope is mounted for oscillation about a horizontal axis each support being rotatable about a vertical axis within said main support and a resilient coupling means for interconnecting the gyroscopes about their horizontal axes.

30. In gyroscopic apparatus, a main support, a pair of members mounted thereon for movement about parallel axes, a rotor and rotor bearing frame mounted within each member for oscillation about an axis at an angle to said parallel axes and resilient means extending between said rotor bearing frames.

31. In a gyro-compass, a support rotatable in azimuth, a pair of directive gyroscopes mounted thereon for rotation with respect thereto about vertical axes, means for causing said support to maintain a predetermined position in azimuth with respect to one of said gyroscopes and yielding means connected to the other of said gyroscopes.

32. In a gyro-compass, a support rotatable in azimuth, a pair of oppositely acting gyroscopes mounted thereon for rotation with respect thereto about vertical axes, means for causing said support to maintain a predetermined position in azimuth with respect to one of said gyroscopes and yielding means connected to the other of said gyroscopes and adapted to cause the natural elevation thereof to be reduced or reversed.

33. In gyroscopic apparatus, a rotatable support, a pair of gyroscopes mounted thereon for precession within the support, means for maintaining the support in a predetermined relation to one only of said gyroscopes, means connecting the two gyroscopes for exerting a torque on the first mentioned gyroscope upon departure of the second gyroscope from its normal position in the frame.

34. In a gyro-compass, a support rotatable in azimuth, a pair of directive gyroscopes mounted thereon for rotation with respect thereto about vertical axes, means for causing said support to maintain a predetermined position in azimuth with respect to one of said gyroscopes, and a spring connecting the two gyroscopes about their vertical axes.

35. In a gyro-compass, a support rotatable in azimuth, a pair of directive gyroscopes mounted thereon for rotation with respect thereto about vertical axes, means for causing said support to maintain a predetermined position in azimuth with respect to one of said gyroscopes, and connecting means between said gyroscopes.

36. In gyroscopic apparatus, a rotatable support, a pair of gyroscopes mounted thereon for precession within the support, means for maintaining the support in a predetermined relation to one of said gyroscopes, a yielding centralizing means connecting a gyroscope and the support, and other yielding means connecting the two gyroscopes.

37. In gyroscopic apparatus, a rotatable support, a pair of gyroscopes mounted thereon comprising a pair of vertical rings rotatably mounted thereon, a rotor and rotor bearing frame pivotally mounted in each ring about a substantially horizontal axis, means for maintaining said support in a predetermined relation to a gyroscope, and a spring connecting the two gyroscopes about their horizontal axes.

38. In gyroscopic apparatus, a rotatable support, a pair of gyroscopes mounted thereon comprising a pair of vertical rings rotatably mounted thereon, a rotor and rotor bearing frame pivotally mounted in each ring about a substantially horizontal axis, means for maintaining said support in a predetermined relation to a gyroscope, and means brought into action by inclination of a gyroscope and interacting on the other gyroscope for damping oscillations of the same.

39. In a gyroscopic compass, a rotatable support, power means for driving the same, a pair of gyroscopes mounted on said support for turning about vertical and horizontal axes, and yielding means connecting said gyroscopes for damping the oscillations of each gyroscope and of the support about the meridian.

40. In a gyroscopic compass, a rotatable support, power means for driving the same, a pair of gyroscopes mounted on said support for turning about vertical and horizontal axes, and a spring connecting said gyroscopes and adapted to apply a damping torque on each gyroscope about its horizontal axis in such direction as to tend to decrease the elevation thereof.

41. A gyro-compass including a frame mounted for movement about a vertical axis, a gyroscope mounted thereon for turning about a vertical axis within the frame, said gyroscope normally rotating in a counterclockwise direction, looking north, and means brought into action by the turning of the gyroscope within the frame away from its centralized position for applying a torque about the vertical axis.

42. A gyro-compass including a frame mounted for movement about a vertical axis, a gyroscope mounted thereon for turning about a vertical axis and oscillation about a horizontal axis within the frame, said gyroscope normally rotating in a counter-clockwise direction, looking north, and means brought into action by the turning of the gyroscope within the frame away from the meridian for applying a torque about the vertical axis in such a direction as to cause the elevation about the horizontal axis to be reduced or reversed.

43. A gyroscopic compass comprising a support movable about a vertical axis, a plurality of gyroscopes having normally horizontal spinning axes, a ring in which each gyroscope is mounted for oscillation about a horizontal axis at an angle to said spinning axis, each ring being rotatable about a vertical axis, and a coupling means for interconnecting the gyroscopes about their horizontal axes.

44. In gyroscopic apparatus, a main support, a pair of rings mounted thereon for movement about parallel axes, a rotor and rotor bearing frame mounted within each ring for oscillation about an axis at an angle to said parallel axes, and a coupling means extending between said rotor bearing frames.

45. A gyro-compass including a frame mounted for movement about a vertical axis, a gyroscope mounted thereon for turning about a vertical axis within the frame, said gyroscope normally rotating in a counter-clockwise direction, looking north, and means brought into action by the turning of the gyroscope within the frame away from its centralized position for applying a torque about the horizontal axis.

46. In a gyroscopic compass, a supporting frame mounted for orientation, a motor for driving said frame, a plurality of rings journaled therein on vertical axes, a rotor and rotor bearing casing mounted for oscillation about horizontal axes in said rings, a coupling connecting said casings and displaceable means actuated by the turning of at least one of said rings in the frame for controlling said motor.

47. The combination with a frame mounted for rotation about a vertical axis, a plurality of interconnected gyroscopes mounted thereon for rotation about vertical axes and displaceable means actuated by the turning of at least one of said rings in the frame for exerting a torque about the axis of said frame.

48. In a gyroscopic compass, a support mounted for orientation, a pair of gyroscopes adapted to be oppositely rotated, mounted thereon for turning about vertical axes and oscillation about horizontal axes within said support, and means brought into action by the turning of the gyroscopes in opposite directions about their vertical axes for causing the natural elevation of one of the gyroscopes to be reduced or reversed.

In testimony whereof I have affixed my signature.

HARRY L. TANNER.